(12) United States Patent
Kim et al.

(10) Patent No.: US 7,203,346 B2
(45) Date of Patent: Apr. 10, 2007

(54) FACE RECOGNITION METHOD AND APPARATUS USING COMPONENT-BASED FACE DESCRIPTOR

(75) Inventors: Hyun-woo Kim, Kyungki-do (KR); Tae-kyun Kim, Kyungki-do (KR); Won-jun Hwang, Seoul (KR); Seok-cheol Kee, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 742 days.

(21) Appl. No.: 10/422,777

(22) Filed: Apr. 25, 2003

(65) Prior Publication Data

US 2003/0215115 A1 Nov. 20, 2003

(30) Foreign Application Priority Data

Apr. 27, 2002 (KR) .................. 10-2002-0023255
Feb. 4, 2003 (KR) .................. 10-2003-0006726

(51) Int. Cl.
*G06K 9/00* (2006.01)

(52) U.S. Cl. .................. 382/118; 382/173; 351/209

(58) Field of Classification Search .................. 382/103, 382/106, 107, 117, 118, 123, 168, 178, 190, 382/203, 209, 250, 274, 283, 291–296, 305; 704/246; 715/700; 351/209
See application file for complete search history.

(56) References Cited

U.S. PATENT DOCUMENTS 6,754,628 B1 * 6/2004 Chaudhari et al. .......... 704/246
6,774,917 B1 * 8/2004 Foote et al. .................. 715/700
6,961,466 B2 * 11/2005 Imagawa et al. ........... 382/190
6,996,257 B2 * 2/2006 Wang .......................... 382/118
7,020,345 B2 * 3/2006 Tsai et al. .................... 382/274

FOREIGN PATENT DOCUMENTS

| JP | 6-168317 | 6/1994 |
| KR | 2000-222572 A | 8/2000 |
| KR | 2001-92963 A | 4/2001 |

OTHER PUBLICATIONS

M. S. Bartlett, "Face Image Analysis by Unsupervised Learning," 2001, Kluwer, Norwell, IMassachusetts, USA.*

(Continued)

*Primary Examiner*—Matthew C. Bella
*Assistant Examiner*—Seyed Azarian
(74) *Attorney, Agent, or Firm*—Buchanan Ingersoll & Rooney PC (57) ABSTRACT

Provided are a face recognition apparatus and method in which a facial image is divided into facial component images. The apparatus includes a component division unit that divides an input facial image into a plurality of facial component images; a face descriptor generating unit that generates face descriptors using a transform matrix corresponding to the respective facial component images, the face descriptors being characteristic vectors; a registered face descriptor database (DB) that stores registered face descriptors; and an authentication unit that authenticates the input facial image by comparing face descriptors for the input facial image input from the face descriptor generating unit with the registered face descriptors and providing predetermined weights corresponding to each facial component to the comparison results of each facial component.

21 Claims, 10 Drawing Sheets

OTHER PUBLICATIONS

European Search Report dated Jan. 18, 2005.

Zhao L et al: "Mosaic image method: a local and global method" Pattern Recognition, vol. 32, No. 8, Aug. 1999, pp. 1421-1433.

Kouzani A Z et al: "Multiresolution eigenface-components" Tencon '97. IEEE Region 10 Annual Conference. Speech and Image Technologies for Computing and Telecommunications., Dec. 2, 1997, pp. 353-356, Australia.

Shakunaga T et al: "Decomposed eigenface for face recognition under various lighting conditions" Proceedings 2001 IEEE conference on computer vision and pattern recognition. Dec. 8, 2001, vol. 1 of 2, pp. 864-871.

Cagnoni S et al: "A modified eigenspace approach to face recognition" Image Analysis and Processing, 1999 IEEE, Sep. 27, 1999, pp. 490-495.

Pentland A et al: "View-based and modular eigenspaces for face recognition", 1994 IEEE, Jun. 21, 1994, pp. 84-91.

M.S. Bartlett: "Face Analysis by Unsupervised Learning", 2001 Kluwer, Norwell, Massachusetts, USA, pp. 46-48, and 117-119.

Hjelmas E et al.: "Face Detection: A Survey", Computer Vision and Image Understanding, Academic Press, San Diego, CA, vol. 83, No. 3, Sep. 2001, pp. 236-274.

S. Theodoridis & K. Koutroumbas: "Pattern Recognition", 1999, Academic Press, San Diego, pp. 155-157, p. 188.

H-C Kim et al.: "Proposal for Face Description using $2^{nd}$-order PCA Mixture Model", Jul. 2001, p. 1-8.

L Wang & T K Tan: "New Proposal for face Feature Description", Mar. 2000, pp. 1-6.

Jian Huang et al: "Component-based LDA method for face recognition with one training sample", IEEE Int. Workshop Analysis and Modeling of Faces and Gestures, 2003, pp. 120-126.

Cychosz L W et al: "A face recognition system using holistic regional feature extraction", Acoustics, Speech, and Signal Processing, May 9, 1995, pp. 3431-3434.

Gottumukkal R et al.: "An improved face recognition technique based on modular PCA approach", Pattern Recognition Letters, North-Holland publ. Amsterdam, NL, Mar. 2004, pp. 429-436, vol. 25, No. 4.

A. Z. Kouzani, F. He, and K. Sammut, Multiresolution Eigenface-Components, 1997 IEEE TENCON—Speech and Image Technologies for Computing and Telecommunications, Dec. 2, 1997. pp. 353-356.

Li Zhao, Yee-Hong Yang, Mosaic image method: a local and global method, Pattern Recognition, Elsevier Science Ltd, Aug. 1999, vol. 32, No. 8, 1421-1433.

Pentland A et al, View-Based and Modular Eigenspaces for Face Recognition, 1994 IEEE Computer Vision and Pattern Recognition, Jun. 21, 1994, pp. 84-91.

Japanese Office Action dated Jan. 4, 2006.

* cited by examiner

| 2:8 scenario | ANMRR | FIR |
|---|---|---|
| LDA | 0.198073 | 0.317368 |
| Cb LDA | 0.104372 | 0.175474 |

| 5:5 scenario | ANMRR | FIR |
|---|---|---|
| Ver1.0 | 0.499 | 0.306 |
| Cb ICA | 0.264 | 0.112 |
| NEC | 0.279 | 0.41 |
| LDA | 0.10049 | 0.185738 |
| Cb LDA | 0.107383 | 0.181544 |
| combined | 0.067863 | 0.12349 |

FACE RECOGNITION METHOD AND APPARATUS USING COMPONENT-BASED FACE DESCRIPTOR

This application claims priorities from Korean Patent Application Nos. 2002-23255 filed on Apr. 27, 2002 and 2003-6726 filed on Feb. 4, 2003 in the Korean Intellectual Property Office, the contents of which are incorporated herein in their entirety by reference.

BACKGROUND OF THE INVENTION

1. Field of the Invention

The present invention relates to a method and apparatus for recognizing a face, and more particularly, to a method and apparatus for recognizing a face using a component-based linear discriminant analysis (LDA) face descriptor.

2. Description of the Related Art

Face recognition has mainly been performed using a principal component analysis (PCA) or an independent component analysis (ICA). Also, face recognition using a face descriptor was introduced by M. Abdel-Mottaleb, J. H. Connell, R. M. Bolle, and R. Chellappa ["Face descriptor syntax, Merging proposals", p181, p551, and p650, ISO/MPEG m5207, Melbourne, 1999].

However, it is difficult to extract facial characteristics from a query image and search for facial images having the same facial identification and similarities, using facial image database containing information regarding changes in pose and illumination. In particular, conventional face recognition algorithms require a plurality of sheets containing query images and therefore do not successfully detect desired facial images using only one sheet or a few sheets containing query images.

Face descriptors suggested in MPEG-7 enable the restoration of a facial image having the same identification as the original facial image using a query image as soon and effectively as the aforementioned prior art can. However, when using these face descriptors, there is a limit to restoring facial images having the same identification with respect to a set of images showing great changes in pose and illumination, using these face descriptors.

Meanwhile, conventional two-dimensional approaches were made to eliminate changes in an image due to a variation in illumination by removing image components positioned in a subspace which is spanned by a predetermined vector. However, identification information included in these projections is likely to be lost during image processing, and thus, it is difficult to conduct precise face recognition.

SUMMARY OF THE INVENTION

The present invention provides an linear discriminant analysis (LDA)-based face recognition apparatus and method in which LDA-based face recognition is conducted by classifying poses to several classes, grouping facial images based on the several pose classes, and compensating for changes in a target image due to the pose changes.

According to the present invention, the facial image is divided into facial component images (e.g., eye images, nose images, mouth images, and forehead images), face recognition is performed on the facial component images, not on the entire facial image, and changes in the facial image due to changes in pose are compensated for by only adjusting translational offsets, not complex matching or warping. In particular, according to the present invention, each facial component has at least two sheets of facial component images stored in a training database. When each facial component includes labeled images, changes in the facial image due to changes in illumination can be compensated for using LDA.

According to an aspect of the present invention, there is provided a face recognition apparatus comprising: a component division unit that divides an input facial image into a plurality of facial component images; a face descriptor generating unit that generates face descriptors using a transform matrix corresponding to the respective facial component images, the face descriptors being characteristic vectors; a registered face descriptor database (DB) that stores registered face descriptors; and an authentication unit that authenticates the input facial image by comparing face descriptors for the input facial image input from the face descriptor generating unit with the registered face descriptors and providing predetermined weights corresponding to each facial component to the comparison results of each facial component.

It is preferable that the apparatus further comprises a transform matrix generating unit that generates the transform matrix and outputs the generated transform matrix to the face descriptor generating unit. The transform matrix generating unit comprises: a training image DB that stores training facial images; a training component division unit that divides the training facial images into a plurality of facial component images; and a transform matrix generator that generates a linear transform matrix for each facial component image where the linear transform matrix maximizes a ratio of dispersion in facial images having different identification to dispersion in facial images having the same identification.

It is preferable that the apparatus further comprises a pose estimator that estimates the pose of an image to be recognized by projecting the image to an eigen face which represents predetermined numbers of poses and outputs the image together with information regarding the pose to the component division unit, wherein the component division unit divides the facial image into several parts in consideration of the pose of the facial image input from the pose estimator.

It is preferable that in (c) the similarities of the respective facial component images are estimated by calculating cross correlation among the face descriptors for the facial component images to be recognized and registered face descriptors, weights are provided to the similarities in consideration of the facial component images, the similarities to which the weights are provided and combined, and a facial image having the largest addition value is authenticated as a facial image to be the same as the input facial image.

According to another aspect of the present invention, there is provided a face recognition method comprising: (a) dividing an input facial image into a plurality of facial component images; (b) generating face descriptors using a transform matrix corresponding to the respective facial components, face descriptors being characteristic vectors representing the respective components of the facial image; and (c) authenticating the input facial image by comparing the face descriptors of the input facial image with registered face descriptors and providing predetermined weights to the respective comparison results, the predetermined weights corresponding to the respective facial components.

It is preferable that the method further comprises generating the transform matrix before (a), wherein generating the transform matrix comprises: preparing training image DB that stores training facial images; dividing the training facial images into a plurality of facial component images; and generating a transform matrix for each facial component image, the transform matrix maximizing a ratio of dispersion in facial images having different identification to facial images having the same identification.

It is preferable that before (a) the method further comprises estimating the pose of the input facial image by projecting the input facial image to eigen faces which represent a predetermined number of poses, wherein in (a) the facial image is divided into facial component images in consideration of the estimated pose.

It is preferable that in (c) the similarities of the respective facial component images are estimated by calculating cross correlation among the face descriptors for the facial component images to be recognized and registered face descriptors, weights are provided to the similarities in consideration of the facial component images, the similarities to which the weights are provided and combined, and a facial image having the largest addition value is authenticated as a facial image to be the same as the input facial image.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

Figure 1:
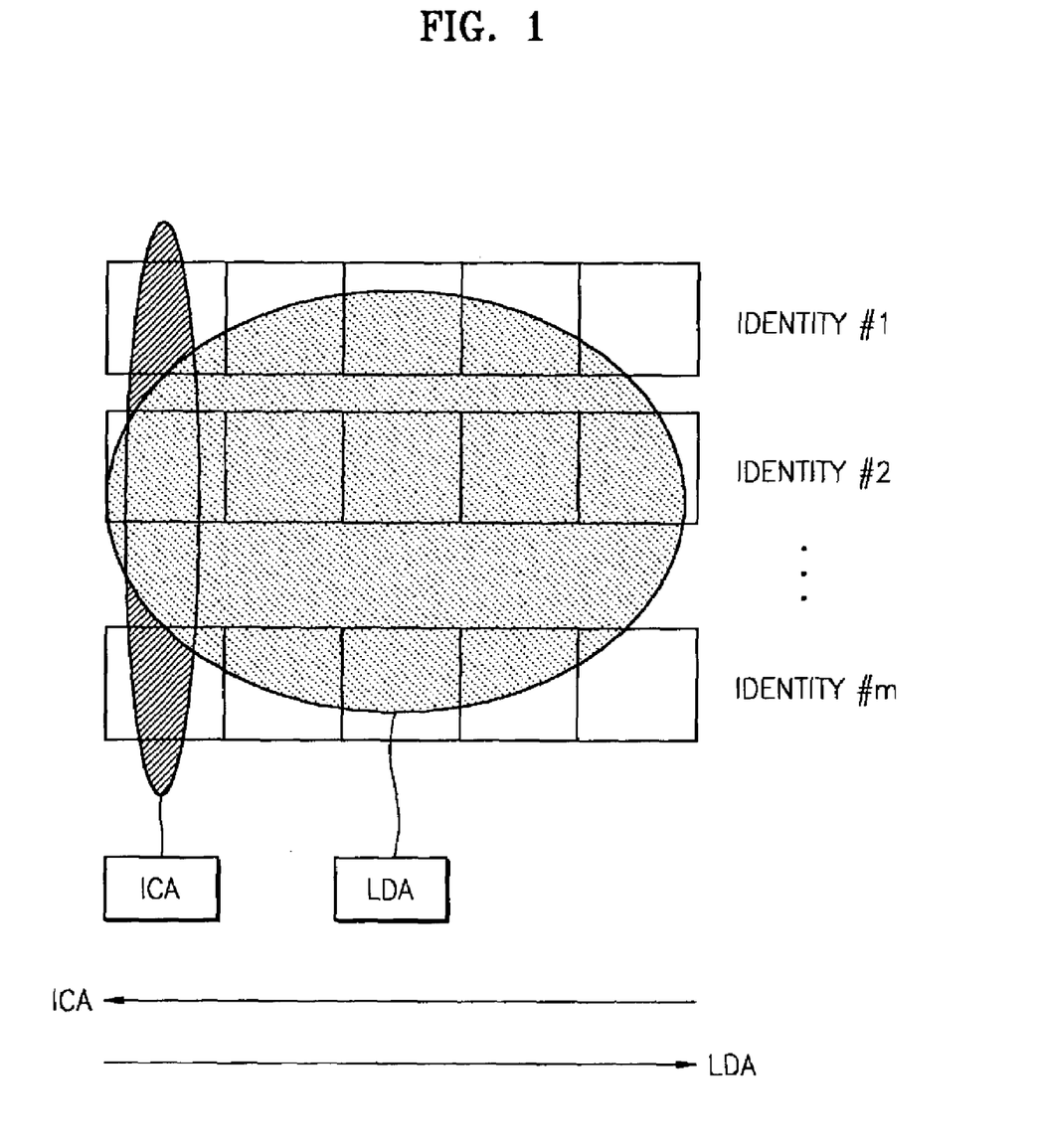
FIG. 1 illustrates image data groups applied to the present invention.

FIG. 1 illustrates image data groups applied to the present invention. Referring to FIG. 1, it is noted that data transformation enables a transition from independent component analysis (ICA) to linear discriminant analysis (LDA) or from LDA to ICA. The data groups of FIG. 1 contain a plurality of images showing the identity of the same person, that is, identities #1 through #m show m images regarding the identity of the same person. The present invention is applicable to a target object having at least two sheets of facial images labeled and stored in a database.

Figure 2A:
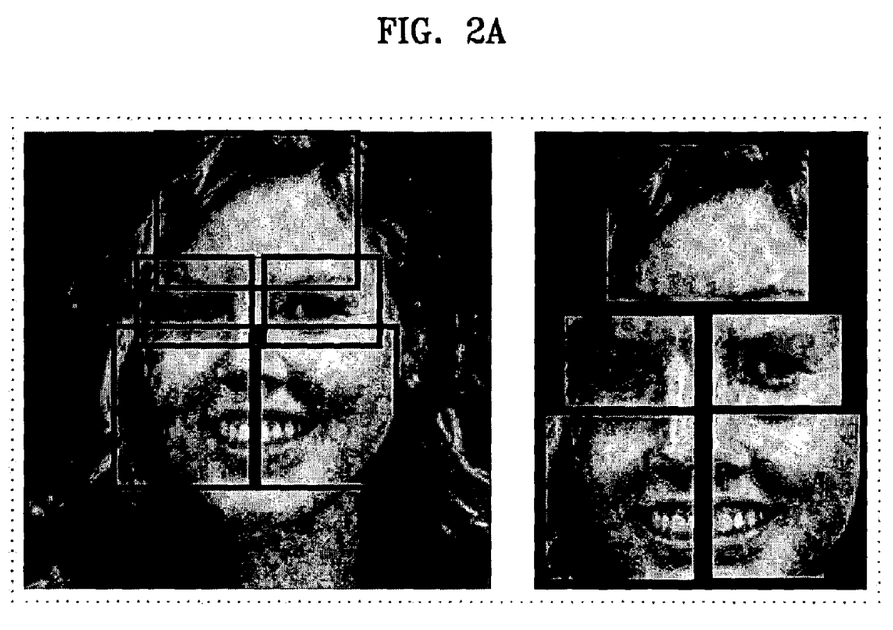
FIGS. 2A through 2C illustrate various methods of dividing a facial image into facial component images according to a preferred embodiment of the present invention.
Figure 2B:
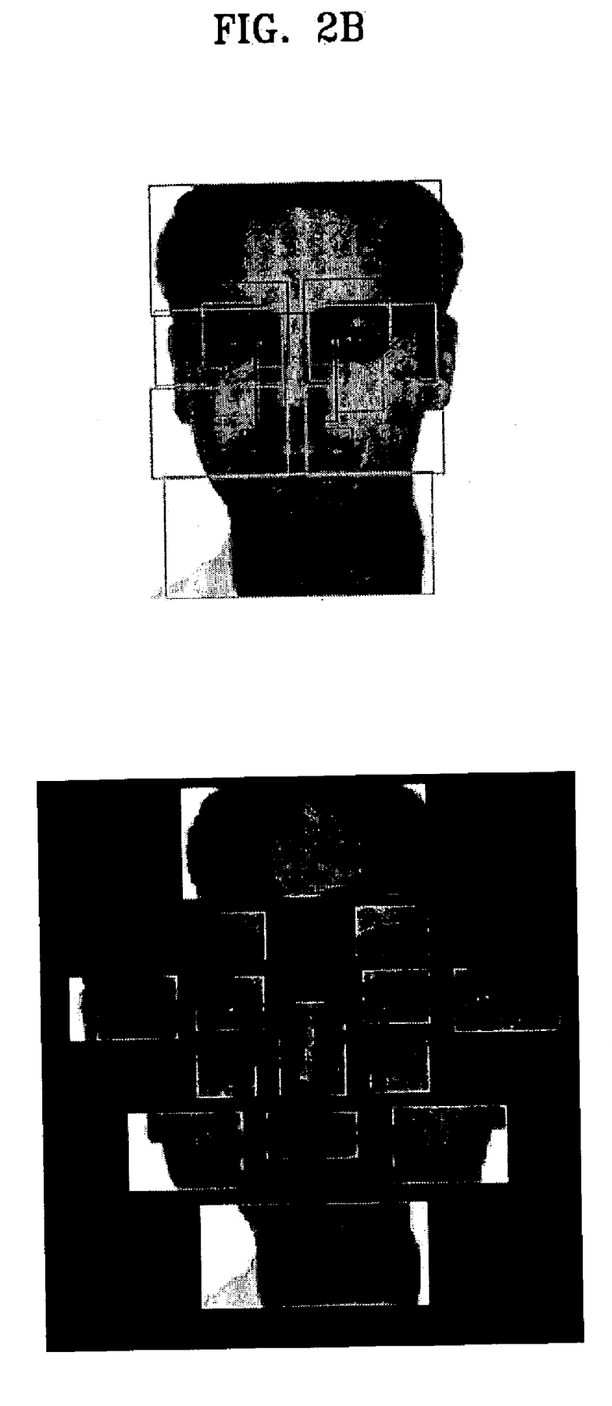
Figure 2C:
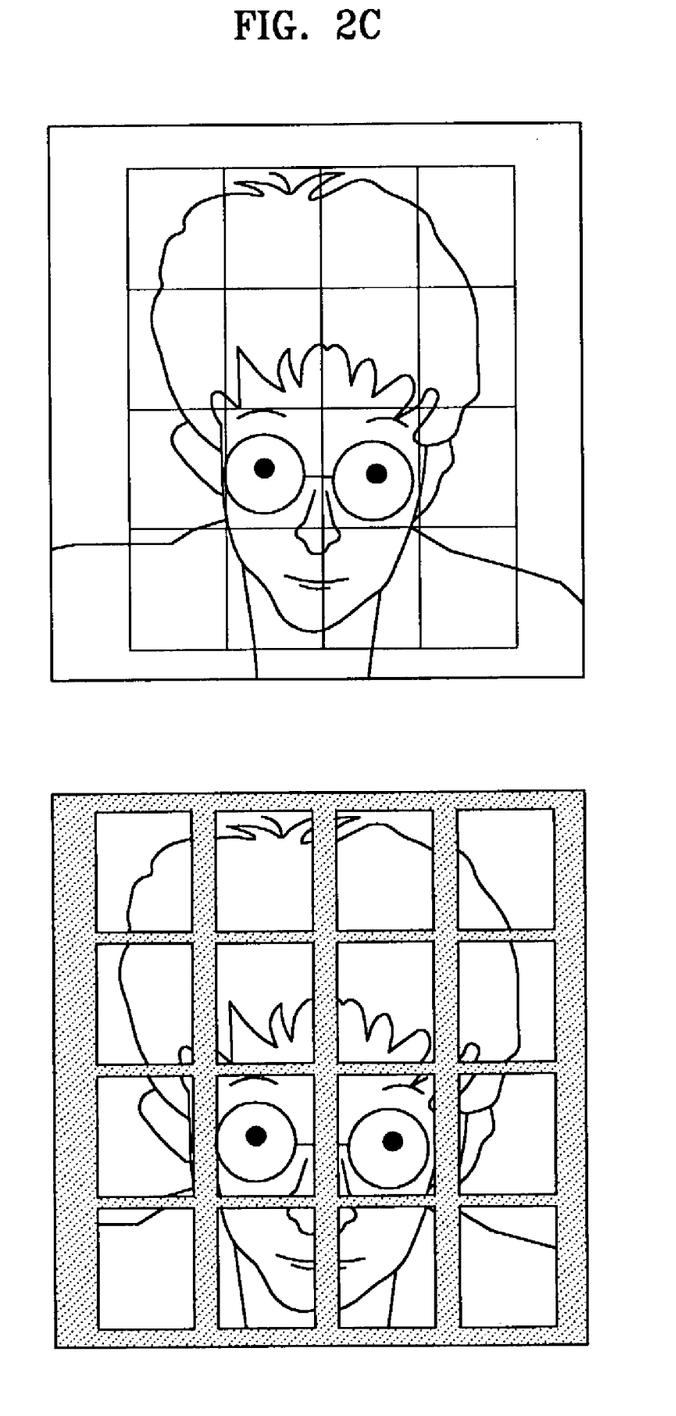

FIGS. 2A through 2C illustrate various methods of dividing a facial image into facial component images according to a preferred embodiment of the present invention. According to the present invention, an input training image is divided into a predetermined number of facial component images. Face descriptors according to the present invention describe a face based on such facial component images. Referring to FIG. 2A, an exemplary input facial image is divided into a predetermined number of facial component images with respect to the forehead, eyes, nose, and mouth of a figure shown in the facial image. Referring to FIG. 2B, a facial image is divided into fourteen facial component images such that the divided images are overlapped with one another to a certain degree. There is no limit to the number of divided images. Meanwhile, according to the present invention, a facial image can not only be divided into a plurality of images with respect to facial components such as eyes, nose, and mouth of a figure shown in the facial image, as shown in FIGS. 2A and 2B but also be divided into a predetermined number of uniform rectangular images as shown in FIG. 2C.

Facial component images, which are divided portions of a facial image, are more robust against changes in illumination and pose than the whole facial image when encoding these images. Further, these facial component images are more flexible than the whole facial image during similarity matching and arrangement adjustment.

In other words, when an image changes due to changes in pose and illumination, changes that occur in the divided facial component images are less than those in the facial image. Thus, the smaller the pieces of which the original facial image is divided into, the easier for the component-based face descriptors to carry out preprocessing and face representation using simpler statistical values.

In general, face recognition based on principal component analysis (PCA)/ICA/LDA statistically encodes the gray-scale correlation between the positions of all pixels, and changes in the original facial image due to changes in the position of a camera and illumination cause serious changes in facial expression. In contrast, component-based face recognition according to the present invention is performed on each piece of a facial image, i.e., facial component images, and image changes are limited to some facial component images.

Therefore, in the present invention, statistical values of a facial image are simplified to facial components. Pieces, e.g., facial component images, of a facial image are more easily preprocessed than that of the whole facial image and are statistically less complex than the whole facial image. For these reasons, the facial component images can be more easily expressed than the facial image. That is, the facial component images are more appropriate for linear assumption based on PCA/ICA/LDA.

In a case where a divided facial component image is overlapped with adjacent component images, the overlapped portions partially represent the relationship between different facial component images. Thus, important relation between he components for describing the characteristics for recognition can be preserved.

In the present invention using facial component images divided from a facial image, it is possible to reduce a weight allocated to a face component image, such as a mouth image, having a large variation in similarity matching performed during face authentication. The respective facial component images can be considered individually in the similarity matching process, and thus, the allocated weights may be determined based on discriminability and prior knowledge. There is a case where a figure shown in a facial image wears sunglasses or a mask and thus a portion of the face of the figure is hidden. In this case, face recognition for the figure can also be desirably conducted, and it is possible to detect the identity of the figure. If facial component images are appropriately arranged by facial component detection and dense matching, compensation for image changes due to changes in the pose of the figure can be made easily and the precision in pose compensation can be increased.

After the pose compensation process, face recognition for a whole facial image requires dense optical flow transformation or global projective/affin transformation in the component-based recognition scheme, whereas the arrangement of facial component images is approximated by calculating a translational offset.

Figure 3A:
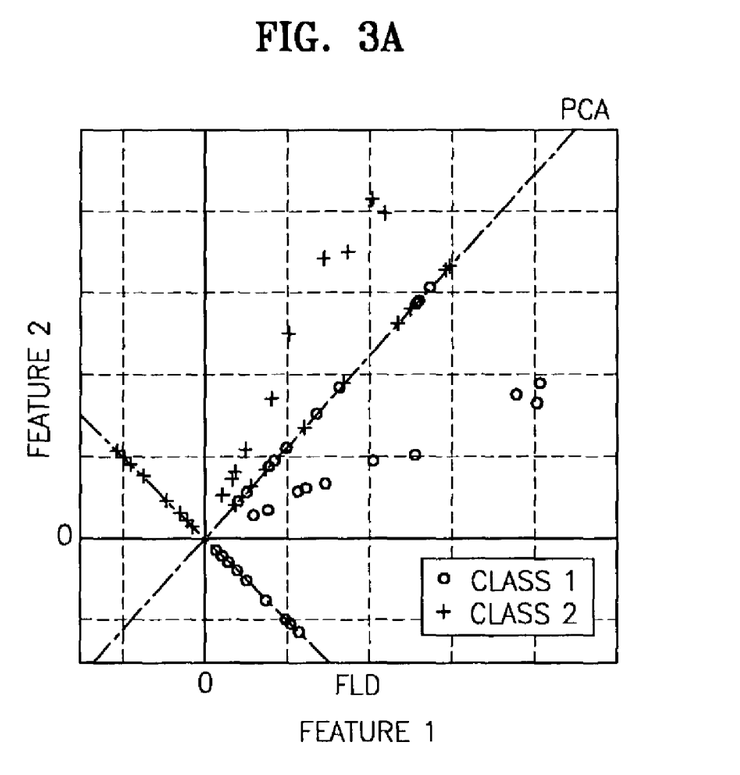
FIGS. 3A and 3B are graphs illustrating the distribution of classes when using a large-scale data set and a small-scale data set.
Figure 3B:
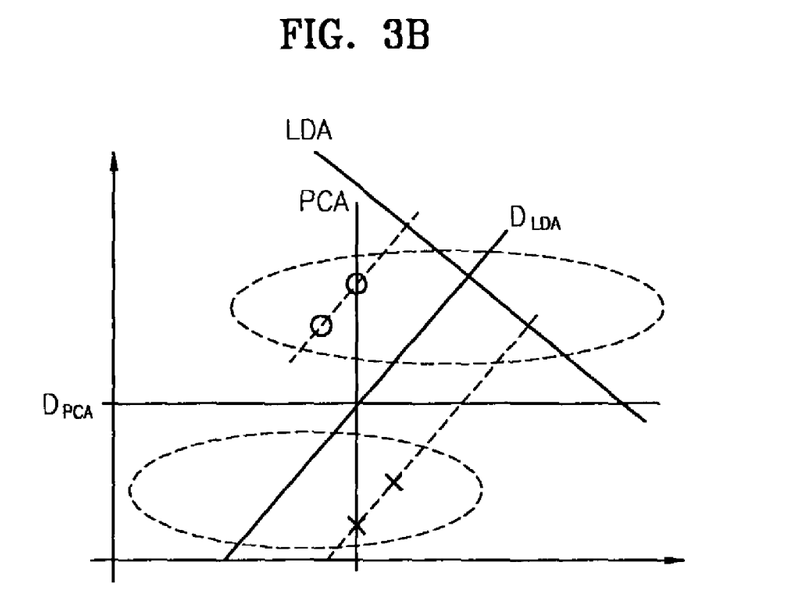

Hereinafter, pose estimation and component arrangement will be explained with reference to FIGS. 3A and 3B. FIGS. 3A and 3B are graphs illustrating the distribution of classes when using a large-scale data set and a small-scale data set, respectively.

As described above, if divided facial component images are appropriately arranged using component detection or dense matching, it is easy to compensate for a variation in pose and increase precision in face recognition. However, dense matching or complete component detection require very difficult and complicated calculations. To solve this problem, the present invention combines pose estimation with component separation and effectively compensates for the variation in pose using the combination.

Pose estimation will first be described. In this embodiment, a training image is divided in frontal, right, left, upper, and lower directions to obtain five pose classes for training, using manual or automatic clustering. However, there is no limit to the directions toward which the training image can be divided. For instance, the training image may further be divided into two pose classes in the right and left directions at 30 angles, besides the five directions. Next, eigenfaces are extracted from the respective pose classes. In a test data set, a test image is projected into five different eigenfaces corresponding to the respective pose classes and then divided into classes having minimum projection errors.

Next, pose compensation is performed. In general, an image corresponding to frontal faces is selected as a reference image, based on allocated pose classes, and the other images having different poses are warped to reference images using affin/projective transformation. Unfortunately, warping requires a large amount of calculation and an error in the classification of the training image lowers precision. However, when the original facial image is divided into several facial component images, errors caused by the classification of the respective facial component images are less than those caused in connection with in the original facial image and, further, a translation offset approximates affin/projective transformation. The translational offset can be calculated by warping an average of locations of a reference point with respect to faces in training data groups. Therefore, facial component images can be appropriately arranged without dense matching and warping, thereby effectively reducing image changes due to the pose variation. A trade off is present between the sizes and number of facial component images and the size of the descriptor.

The arrangement of the facial component images removes the pose variation, and therefore, corresponding component images can be used as face descriptors and used in calculating the similarities thereof. As a result, the precision in face recognition can be improved.

Linear discriminant analysis (LDA) according to the present invention will now be explained. Since all of data groups in MPEG-7 are labeled, supervised learning such as LDA can be applied thereto. The supervised learning such as LDA removes variations in illumination and pose. Further, LDA enables effective processing of a figure recognition scenario in which two images are registered as an example of identity learning.

LDA and a Fisher's Linear Discriminant (FLD) are class specific methods since they express data to be easily classified into several data groups.

When N image sets $\{x_1, x_2, \ldots, x_N\}$, which belong to one of the C classes $\{X_1, X_2, \ldots, X_C\}$, are given, LDA selects linear transform matrix W to maximize a ratio of a between-class scatter to a within-class scatter.

A between-class scatter matrix $S_B$ and a within-class scatter matrix $S_W$ can be mathematically defined as follows:

$$S_B = \sum_{i=1}^{c} N_i(\mu_i - \mu)(\mu_i - \mu)^T \quad (1)$$

$$S_W = \sum_{i=1}^{c} \sum_{x_k = X_i} (x_k - \mu_i)(x_k - \mu_i)^T,$$

wherein $\mu_i$ denotes an average image of class $X_i$ and $N_i$ denotes a numeral for an image belonging to class $X_i$. If the within-class scatter matrix $S_W$ is not singular, LDA calculates an orthonormal matrix $W_{opt}$ that maximizes a ratio of a determinant for the within-class scatter matrix $S_W$ to a determinant for the between-class scatter matrix $S_B$.

An LDA projection matrix can be expressed as follows:

$$W_{opt} = \arg\max_{W} \frac{|W^T S_B W|}{|W^T S_W W|} = [w_1 \; w_2 \; \cdots \; w_m] \quad (2)$$

wherein a solution set $\{W_i | i=1, 2, \ldots, \text{and } m\}$ denotes the solutions of general eigen vectors $S_B$ and $S_W$ which correspond to m largest eigen values $\{\lambda_i | i=1, 2, \ldots, \text{and } m\}$. If $i=1, 2, \ldots, m$, $S_B W_i = \lambda_i S_W W_i$.

In general, in order to prevent the eigen vector $S_W$ having singularity, the PCA decreases the dimension of vectors before applying it to LDA. Each LDA characteristic vector is expressed as a vector projection $y_k = W_{opt}^T x_k$ when $k=1,2,\ldots,N$. Thus, a facial image x can be simplified using an LDA characteristic vector $y^o = (W^o)^T$ when an LDA transform matrix $W^o = W_{opt}$.

A component-based LDA face descriptor according to the present invention will be explained.

In the present invention, LDA is combined with a component-based approach based on desirable linearity and robustness of component-based approach with respect to changes in an image. LDA is individually applied to several facial component images that are divided portions of a facial image, thereby improving precision in face recognition. In this disclosure, LDA applied to the original facial image is referred to as holistic LDA, and LDA applied to facial component images is referred to as component-based LDA. Also, a combination of holistic LDA and component-based LDA is referred to as a combined LDA.

First, an LDA transform matrix is extracted from a training data set. If N training images $\{x_1, x_2, \ldots, x_N\}$ are provided, each of the N training images is divided into L facial component images based on a predetermined facial component division definition. All of the divided facial component images are combined and the result is expressed in a vector format, i.e., $\{z_1^k, z_2^k, \ldots, z_N^k\}$ with respect to a $k^{th}$ facial component image. Next, an LDA transform matrix is trained with respect to each facial component set.

Next, an LDA matrix $W^k$, which correspond to the $k^{th}$ facial component image, is calculated. Lastly, an LDA transform matrix set $\{W^1, W^2, \ldots W^L\}$ is stored for face recognition and identification.

Next, an L vector $\{z^1, z^2, \ldots, z^L\}$, which corresponds to the divided face component image, is extracted from a facial image X belonging to the test data set. An LDA characteristic vector set, i.e., $y=\{y^1, y^2, \ldots, y^L\}$ is calculated by transforming the facial component vector using a corresponding LDA transform matrix. The characteristic vector is calculated by $y^k=(W^k)^T z^k$ and $k=1, 2, \ldots L$.

Accordingly, the facial image X is briefly expressed with the LDA characteristic vector $\{y^1, y^2, \ldots, y^L\}$ when using component-based LDA and is expressed with the LDA characteristic vector $\{y^0; y^1, y^2, \ldots, y^L\}$ when using combined LDA. Also, LDA characteristic vector with respect to the whole facial image is denoted as $y^0$ in holistic LDA.

Similarity matching using a face descriptor will now be described. When two facial images $x_1$ and $x_2$ have LDA characteristic vector sets $y_1$ and $y_2$, respectively, component-based LDA calculates the similarity $d(y_1, y_2)$ between the two facial images $x_1$ and $x_2$ using the cross correlation between corresponding facial components, as follows:

$$d(y_1, y_2) = \frac{1}{L}\sum_{k=1}^{L} w_k \frac{y_1^k \cdot y_2^k}{\|y_1^k\| \|y_2^k\|}, \quad (3)$$

wherein $y_1^k$ and $y_2^k$ denote LDA characteristic vectors of a $k^{th}$ facial component of the two facial images $x_1$ and $x_2$, respectively, and $W_k$ denotes a weight factor for the $k^{th}$ facial component. When using combined LDA, a characteristic vector set includes an LDA characteristic vector $y^0$ with respect to the facial images $x_1$ and $x_2$. Therefore, k begins from 0, not from 1.

Hereinafter, a face recognition apparatus using a component-based LDA face descriptor, according to a preferred embodiment of the present invention, will be explained with reference to FIGS. 4A and 4B.

Figure 4A:
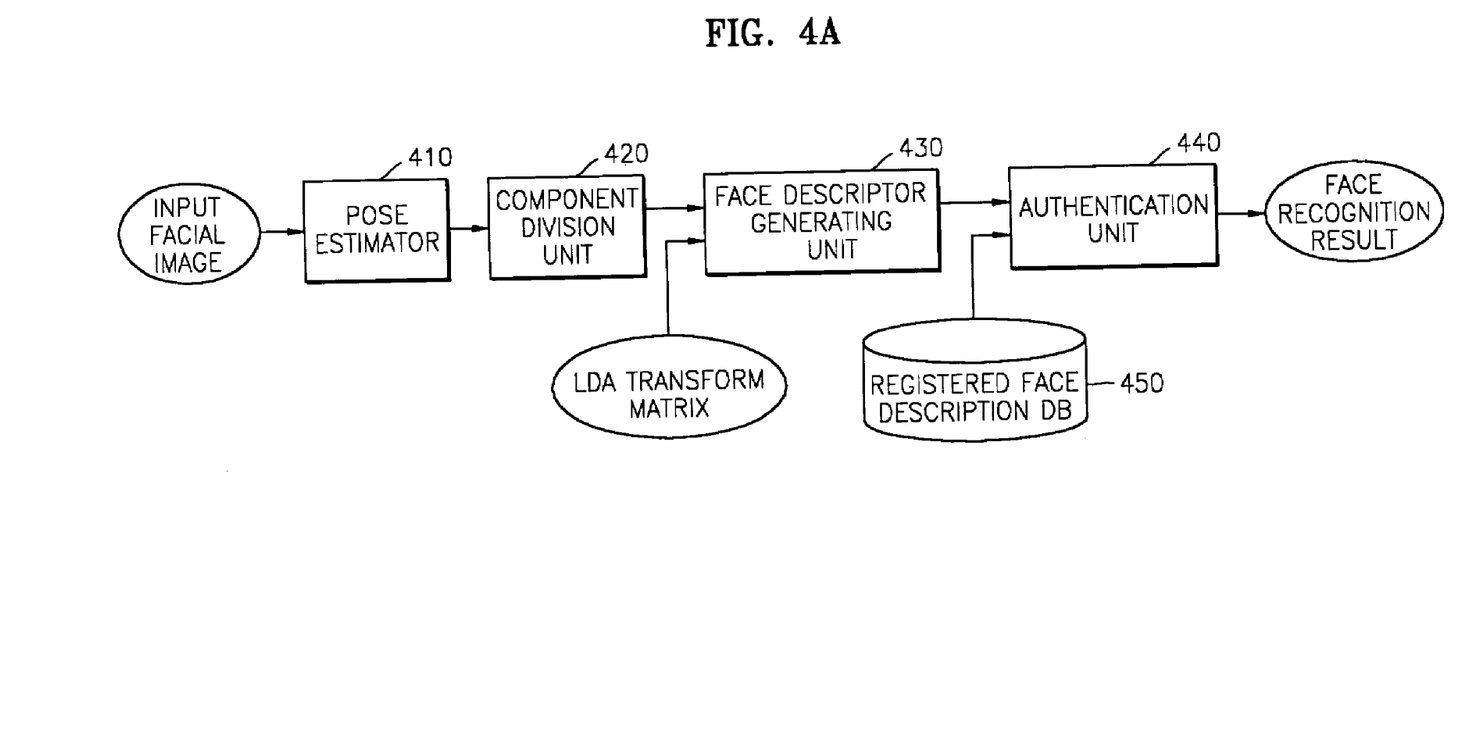
FIG. 4A is a block diagram of a face recognition apparatus according to a preferred embodiment of the present invention.
Figure 4B:
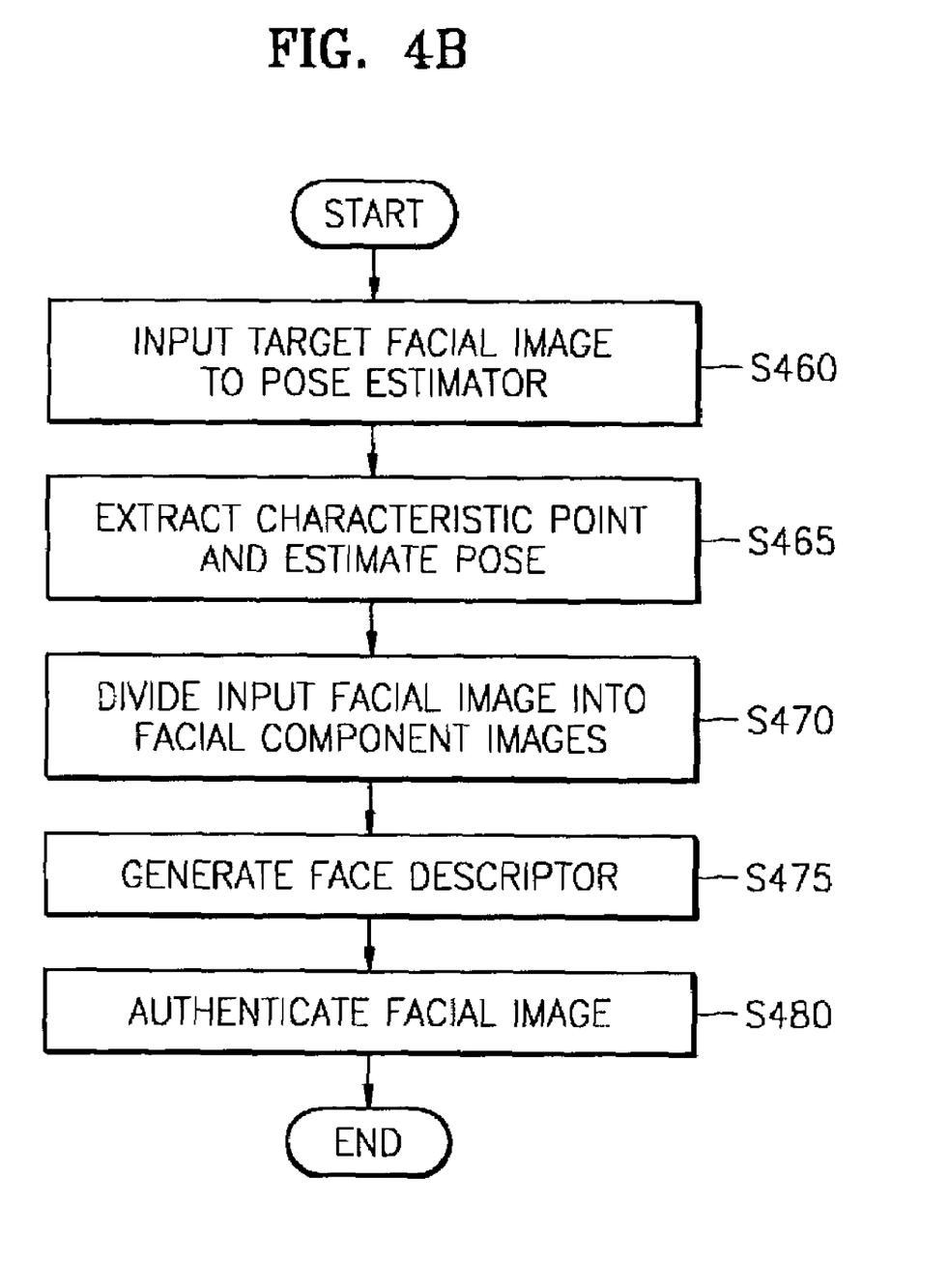
FIG. 4B is a flowchart illustrating a face recognition method according to a preferred embodiment of the present invention.

FIG. 4A is a block diagram of a face recognition apparatus according to a preferred embodiment of the present invention, and FIG. 4B is a flowchart illustrating a face recognition method according to a preferred embodiment of the present invention.

Referring to FIG. 4A, the face recognition apparatus according to the present invention includes a pose estimator 410 that estimates and classifies the pose of an input facial image; a component division unit 420 that divides the input facial image, which is expressed with characteristic vectors, into several facial component images; a face descriptor generating unit 430 that receives LDA transform matrixes for the respective facial component images and generates face descriptors for the respective facial component images of the input facial image, which is input from the component division unit 420, using the received LDA transform matrixes; a registered face descriptor database (DB) 450 that stores the registered face descriptors; and an authentication unit 440 that compares the face descriptors, which are input from face descriptor generating unit 430, with registered face descriptors and authenticates the input facial image based on the comparison result Referring to FIG. 4B, a face recognition method according to a preferred embodiment will be explained.

First, when an input facial image is input to the pose estimator 410 in step 460, the pose estimator 410 detects the position of the eyes of the facial image and normalizes the facial image according to the position of the eyes. Next, the pose estimator 410 projects the normalized image to an eigen face belonging to a predetermined pose class in order to estimate the pose of the facial image and classifies the input facial image into a class to which the eigen face that makes a projection error with input image minimized belongs, in step 465. In this embodiment, the pose of the input facial image is divided into frontal, upper, and lower directions, and right and left directions at 30°, and changes in the pose are compensated for using the aforementioned translational offset or affin/projective transformation.

The component division unit 420 divides the input facial image in units of facial components, such as eyes, nose, ears, mouth, and forehead of a figure shown in the image, in consideration of the relative position of the input facial image input from the pose estimator 410, and then, the respective facial component images are output to the face descriptor generating unit 430, in step 470. Alternatively, as mentioned above, the component division unit 420 may divide the input facial image into several rectangular portions.

Figure 5A:
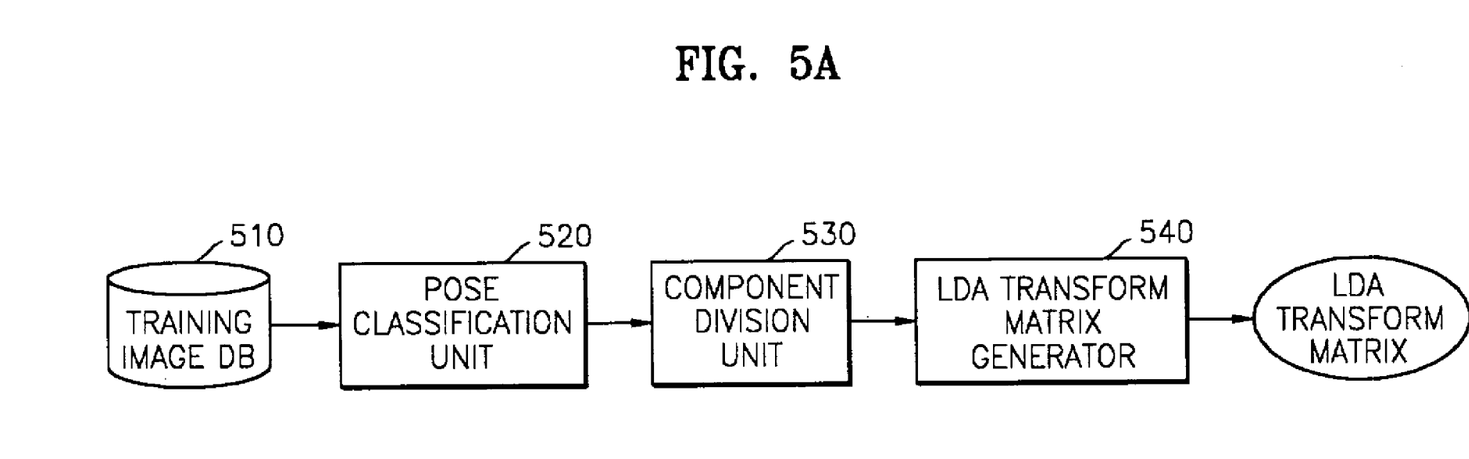
FIG. 5A is a block diagram of an apparatus for generating a transform matrix according to a preferred embodiment of the present invention.

The face descriptor generating unit 430 generates face descriptors for the respective facial component images input from the component division unit 420 using an LDA transform matrix input from a transform matrix generator 540 shown in FIG. 5A, in step 475. An apparatus and method for generating the LDA transform matrix will later be described with reference to FIGS. 5A and 5B.

A method of generating a face descriptor will now be described. First, if a $k^{th}$ facial component image vector, which is input from the component division unit 420, is $X^k$, the face descriptor generating unit 430 receives an LDA transform matrix $W^k$ for the $k^{th}$ facial component from the outside and calculates a face descriptor $y^k$ for the $k^{th}$ facial component using a vector projection as follows:

$$y^k = (w^k)^T X^k \quad (4)$$

The face descriptor generating unit 430 generates face descriptors for all of the facial component images using Equation 4 and outputs the generated face descriptors to the authentication unit 440.

Next, the authentication unit 440 estimates the similarity between the face descriptors for the input facial image (input from the face descriptor generating unit 430) and the registered face descriptors stored in the registered face descriptors DB 450 using Equation 3. If the estimated similarity exceeds a predetermined threshold, the authentication unit 440 authenticates the input facial image as the registered facial image and determines that the input facial image is not the registered facial image otherwise in step 480.

Meanwhile, the face descriptor 430 of the aforementioned face recognition apparatus according to the present invention may preprocess the respective facial component images by performing a predetermined transformation process, e.g., PCA transformation, thereon, thereby considerably reducing the order of the input facial image.

Hereinafter, an apparatus and method for generating the LDA transform matrix will be described with reference to FIGS. 5A and 5B. The LDA transform matrix according to the present invention is generated using training image data stored in a training image DB.

Referring to FIG. 5A, the apparatus includes a training image DB 510 that stores training images for the generation of transform matrixes; a pose classification unit 520 that classifies images stored in the training image DB 510 according to the pose of figures shown in the images; a component division unit 530 that divides the images, which are classified according to the poses, into units of facial components; and an LDA transform matrix generator 540 that generates LDA transform matrixes for the respective facial component images.

Figure 5B:
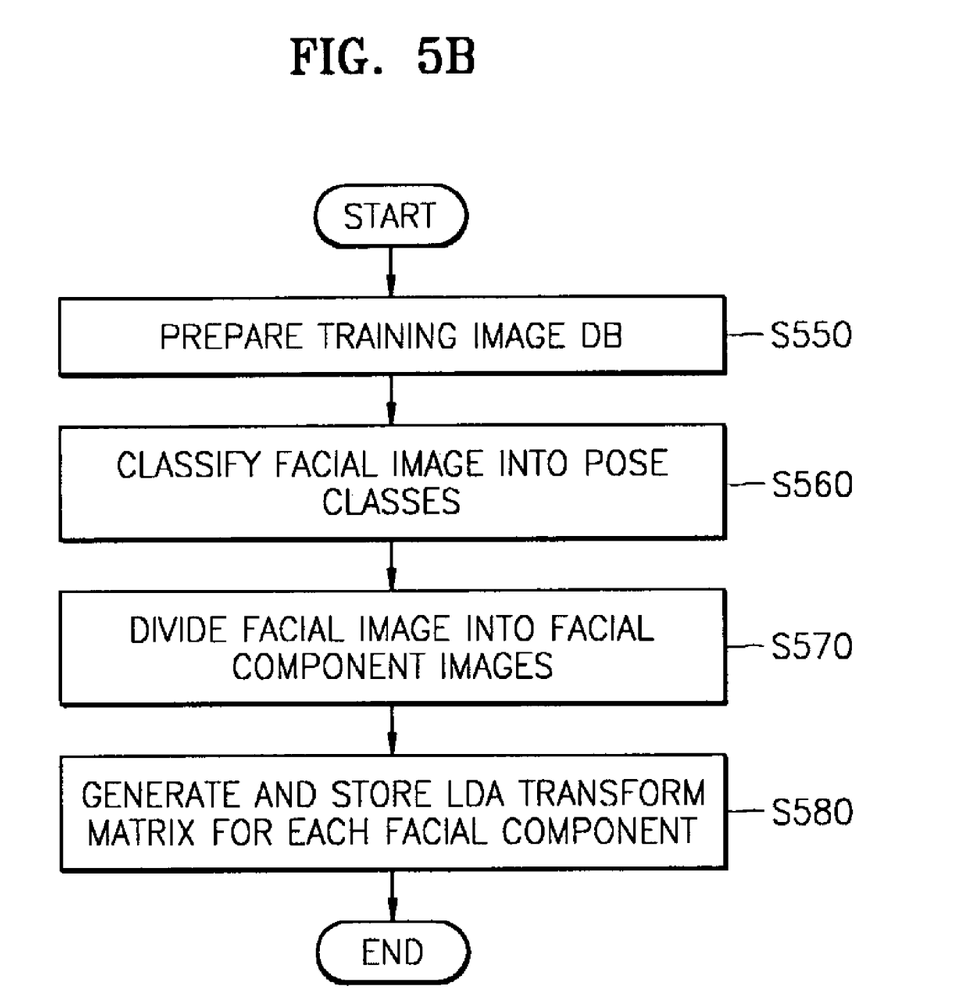
FIG. 5B is a flowchart illustrating a method of generating a transform matrix according to a preferred embodiment of the present invention.

Referring to FIG. 5B, the transform matrix generator 540 includes a training image DB 510 in which respectively labeled training images are stored in step 550.

The pose classification unit 520 detects the position of the eyes of a figure shown in a training facial image input from a face recognition apparatus according to the present invention and normalizes the training images stored in the training image DB510 based on the detected position. For normalization, a characterization point of the figure may be obtained from a facial component other than its eyes. As mentioned above, the pose classification unit 520 classifies an input facial image into certain pose classes, e.g., frontal, left, right, upper, and lower pose classes, using manual or automatic clustering, compensates for changes in the pose of the input facial image, stores the compensation results, and extracts eigen faces from the pose classes, in step 560. The extracted eigen faces are used to estimate the pose of a facial image to be recognized by the face recognition apparatus of FIG. 4A.

The component division unit 530 divides the input facial images having various poses into facial component images in the same manner that the component division unit 420 of the face recognition apparatus of FIG. 4 divides the input facial image, and then outputs the respective divided facial component images to the LDA transform matrix generator 540, in step 570.

The LDA transform matrix generator 540 generates an LDA transform matrix which maximizes a ratio of a determinant of a between-class scatter matrix to that of a within-class scatter matrix with respect to each face component class, using the aforementioned Equations 1 and 2, in step 580.

A face recognition apparatus and method according to a preferred embodiment of the present invention have been explained. Meanwhile, the face recognition apparatus according to the present invention is capable of not only authenticating whether an input facial image is registered but also determining whether similar facial images indicate the same face. In the latter case, it is possible to determine whether two different sheets of facial images correspond to the same facial image by transforming them to face descriptors using the aforementioned method and measuring the similarity between the face descriptors using the aforementioned authentication unit.

Further, according to the present invention even if some components are covered with a mask or sunglasses, face authentication can be performed by measuring the similarity between facial component images which are not covered.

A face recognition apparatus and method according to the present invention may be used to detect a desired facial image. For detection, an authentication unit of the face recognition apparatus compares a face descriptor input from a face descriptor generating unit with face descriptors stored in a registered face descriptor DB to measure the similarity among these face descriptors. Next, the authentication unit selects facial images whose similarities are a predetermined value or more and outputs them sequentially from a facial image having the highest similarity to one having the lowest similarity. Also, with a face recognition method according to the present invention, it is possible to measure the similarity of each face component image, and therefore, it is possible to detect facial images whose portions are similar to a portion of a target facial image.

Figure 6:
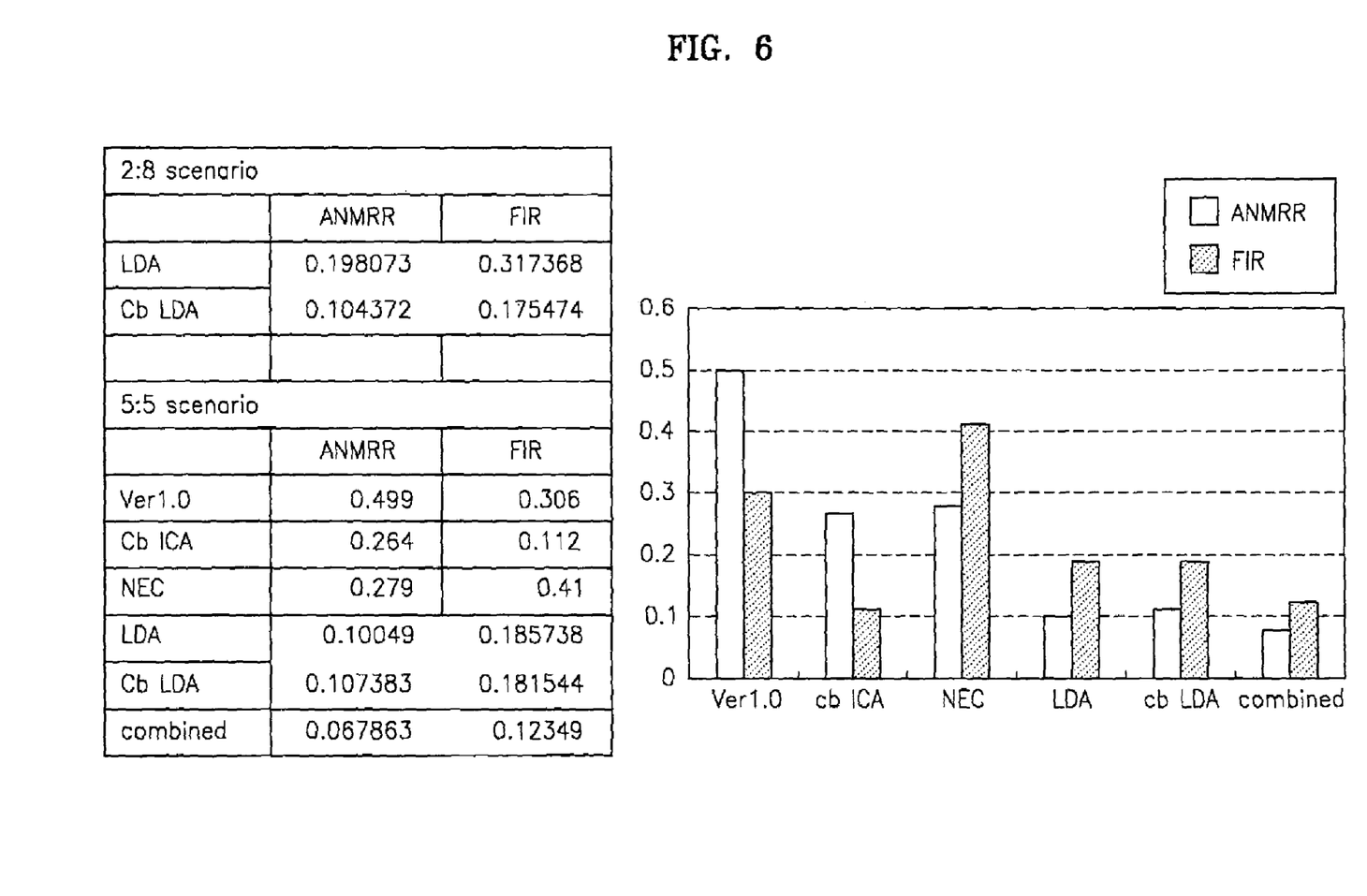
FIG. 6 illustrates an improvement of the present invention upon the prior art.

Referring to FIG. 6, the results of face recognition performed on five sheets of facial images for each of 635 persons when ratios of a training image to a test image are set to 2:8 ad 5:5 are shown. The results reveal an improvement of the present invention over the prior art.

The present invention can be embodied as a computer readable code in a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be distributed among computer systems that are interconnected through a network, and the present invention may be stored and implemented as a computer readable code in the distributed system.

While this invention has been particularly shown and described with reference to preferred embodiments thereof, it will be understood by those skilled in the art that various changes in form and details may be made therein without departing from the spirit and scope of the invention as defined by the appended claims. Thus, the embodiments should not be construed as limiting this invention, but the true scope of which is determined by the following claims and their equivalents.

As described above, according to the present invention, LDA is applicable not only to a whole facial image but also to several facial component images that are divided portions of the facial image, thereby remarkably increasing the reliability of face recognition regardless of changes in illumination or pose. Accordingly, it is possible to determine whether divided facial component images are related to the same facial image, thereby enabling face recognition for a facial image in which a portion of a figure is invisible.

In addition, during face detection, it is possible to detect figures having the similar facial contours and figures, portions of which are similar with one another by appropriately adjusting weights given on facial components.

What is claimed is:

1. A face recognition apparatus comprising:
   a component division unit that divides an input facial image into a plurality of facial component images;
   a face descriptor generating unit that generates face descriptors using a transform matrix corresponding to the respective facial component images, the face descriptors being characteristic vectors, wherein the transform matrix transforms the facial image such that dispersion in the facial image vectors having the same identification decreases and dispersion in the facial image vectors having different identification increases:
   a registered face descriptor database (DB) that stores registered face descriptors; and
   an authentication unit that authenticates the input facial image by comparing face descriptors for the input facial image input from the face descriptor generating unit with the registered face descriptors and providing predetermined weights corresponding to each facial component to the comparison results of each facial component.

2. The apparatus of claim 1, further comprising a transform matrix generating unit that generates the transform matrix and outputs the generated transform matrix to the face descriptor generating unit, wherein the transform matrix generating unit comprises:
a training image DB that stores training facial images;
a training component division unit that divides the training facial images into a plurality of facial component images; and
a transform matrix generator that generates a linear transform matrix for each facial component image where the linear transform matrix maximizes a ratio of dispersion in facial images having different identification to dispersion in facial images having the same identification.

3. The apparatus of claim 1, wherein the component division unit divides the facial image into a plurality of facial component images such that the divided images are partially overlapped with one another.

4. The apparatus of claim 1, wherein the component division unit divides the input facial image into a predetermined number of rectangular images.

5. The apparatus of claim 1, wherein the face descriptor generating unit generates face descriptors by decreasing the order of the facial component vectors by performing principal component analysis (PCA) on the facial component images input from the component division unit and transforming the facial component vectors using the transform matrix.

6. The apparatus of claim 1, wherein the authentication unit estimates the similarities of the respective facial component images by calculating cross correlation between the face descriptors of the facial component images and the registered face descriptors, providing weights to the similarities in consideration of the facial component images, adding the similarities to which the weights are provided, and authenticating a facial image having the largest addition value to be the same as the input facial image.

7. The apparatus of claim 1, wherein the authentication unit estimates the similarities between the face descriptors of the respective facial component images and the registered face descriptors, provides weights to the similarities in consideration of the facial component images, adds the respective similarities to which the weight are provided, and outputs facial images sequentially from a facial image having the highest addition value to a facial image having the lowest addition value.

8. The apparatus of claim 1, further comprising a pose estimator that estimates the pose of an image to be recognized by projecting the image to an eigen face which represents predetermined numbers of poses and outputs the image together with information regarding the pose to the component division unit, wherein the component division unit divides the facial image into several parts in consideration of the pose of the facial image input from the pose estimator.

9. A face recognition method comprising:
(a) dividing an input facial image into a plurality of facial component images;
(b) generating face descriptors using a transform matrix corresponding to the respective facial components, face descriptors being characteristic vectors representing the respective components of the facial image; wherein the transform matrix transforms the facial image such that dispersion in the facial image vectors having the same identification decreases and dispersion in the facial image vectors having different identification increases; and
(c) authenticating the input facial image by comparing the face descriptors of the input facial image with registered face descriptors and providing predetermined weights to the respective comparison results, the predetermined weights corresponding to the respective facial components.

10. The method of claim 9, further comprising generating the transform matrix before (a), wherein generating the transform matrix comprises:
preparing training image DB that stores training facial images;
dividing the training facial images into a plurality of facial component images; and
generating a transform matrix for each facial component image, the transform matrix maximizing a ratio of dispersion in facial images having different identification to facial images having the same identification.

11. The method of claim 9, wherein in (a) the input facial image is divided into a plurality of facial component images so that the divided images are overlapped with one another.

12. The method of claim 9, wherein in (a) the input facial image is divided into a predetermined number of rectangular images.

13. The method of claim 9, wherein in (b) the face descriptors are generated by decreasing the orders of facial component vectors by performing PCA on the divided facial component images and by transforming the facial component vectors using the transform matrix.

14. The method of claim 9, wherein in (c) the similarities of the respective facial component images are estimated by calculating cross correlation among the face descriptors for the facial component images to be recognized and registered face descriptors, weights are provided to the similarities in consideration of the facial component images, the similarities to which the weights are provided and combined, and a facial image having the largest addition value is authenticated as a facial image to be the same as the input facial image.

15. The method of claim 9, wherein during the authentication of the input facial image, the similarities between the respective face descriptors of the respective facial component images, which are divided portions of the facial image, are estimated, weights are provided to the similarities in consideration of the facial component images, the similarities to which the weights are provided and combined, and registered facial images are output sequentially from a facial image having the highest addition value.

16. The method of claim 9, before (a) further comprising estimating the pose of the input facial image by projecting the input facial image to eigen faces which represent a predetermined number of poses, wherein in (a) the facial image is divided into facial component images in consideration of the estimated pose.

17. A recording medium that records the face recognition method claimed in claim 9 as a program code that can be read and executed in a computer.

18. A recording medium that records the face recognition method claimed in claim 10 as a program code that can be read and executed in a computer.

19. A recording medium that records the face recognition method claimed in claim 16 as a program code that can be read and executed in a computer.

20. A method of generating a face descriptor for a facial image, comprising:
generating first characteristic vectors to represent the face image, using a first transform matrix corresponding to the facial image;

dividing the facial image into a plurality of facial component images, and generating second characteristic vectors to represent each of the facial component images, using a second transform matrix corresponding to each of the facial component images; and combining the first characteristic vectors for the facial image and the second characteristic vectors for each of the facial component images to generate the face descriptor, wherein each of the first and second transform matrices transforms vectors of the facial image and the facial component images, such that dispersion in the vectors of the facial image and the facial component images having the same identification decreases and dispersion in the vectors of the facial image and the facial component images having different identification increases.

21. An apparatus of generating a face descriptor for a facial image, comprising:

a component division unit that divides the facial image into a plurality of facial component images; and a face descriptor generating unit that generates first characteristic vectors to represent the face image, using a first transform matrix corresponding to the facial image, generates second characteristic vectors to represent each of the facial component images, using a second transform matrix corresponding to each of the facial component images, and combines the first characteristic vectors for the facial image and the second characteristic vectors for each of the facial component images to generate the face descriptor, wherein each of the first and second transform matrices transforms vectors of the facial image and the facial component images, such that dispersion in the vectors of the facial image and the facial component images having the same identification decreases and dispersion in the vectors of the facial image and the facial component images having different identification increases.

* * * * *